US007170248B2

(12) United States Patent
Tsui et al.

(10) Patent No.: US 7,170,248 B2
(45) Date of Patent: Jan. 30, 2007

(54) SYSTEMS AND METHODS FOR OPERATING A BARRIER

(76) Inventors: Gallen Ka Leung Tsui, 17 Sheard Avenue, Brampton, Ontario (CA) L6Y 1J3; Philip Y. W. Tsui, 17 Sheard Avenue, Brampton, Ontario (CA) L6Y 1J3

( * ) Notice: Subject to any disclaimer, the term of this patent is extended or adjusted under 35 U.S.C. 154(b) by 0 days.

(21) Appl. No.: 10/927,702

(22) Filed: Aug. 27, 2004

(65) Prior Publication Data

US 2005/0193629 A1 Sep. 8, 2005

Related U.S. Application Data

(60) Provisional application No. 60/538,314, filed on Jan. 21, 2004.

(51) Int. Cl.
*G05B 5/00* (2006.01)

(52) U.S. Cl. ...................... 318/466; 318/636; 318/467; 318/727; 318/700; 318/266; 318/283

(58) Field of Classification Search ................ 318/466, 318/636, 467, 266, 286, 282, 727, 700, 468; 160/310, 3
See application file for complete search history.

(56) References Cited

U.S. PATENT DOCUMENTS

| | | | | |
|---|---|---|---|---|
| 4,319,169 | A * | 3/1982 | Kucharczyk | 318/266 |
| 5,198,974 | A | 3/1993 | Orsat | |
| 5,540,269 | A * | 7/1996 | Plumer | 160/3 |
| 5,852,897 | A | 12/1998 | Sukale | |
| 5,910,075 | A | 6/1999 | Arnell et al. | |

* cited by examiner

*Primary Examiner*—Karen Masih
(74) *Attorney, Agent, or Firm*—Crowell & Moring LLP

(57) ABSTRACT

Disclosed are systems and methods for operating a barrier. In one embodiment, a door operator can be opened or closed by triggering either an internal device (e.g., wall button) or an external device. In one embodiment, if an obstacle is detected when the door is opening or closing, the door will either stop or swing in the reverse direction. In yet a further embodiment, the door operator is implemented using an alternating current (AC) synchronous motor.

39 Claims, 4 Drawing Sheets

SYSTEMS AND METHODS FOR OPERATING A BARRIER

CROSS REFERENCE TO RELATED APPLICATION

This application is related to and claims priority from the U.S. provisional patent application having application no. 60/538,314, filed on Jan. 21, 2004.

BACKGROUND OF THE INVENTION

1. Field of the Invention

The invention relates in general to systems and methods for operating a barrier such as a door, and in particular to operating a barrier with the use of an alternating current synchronous motor.

2. Background

Door operators that operate automatically are commonly used in high traffic public areas, such as airports, supermarkets, and department stores. Most of these automatic door operators make use of infrared sensing or other human detection means to trigger such door opening/closing action. Other automatic door operators are available for use with swinging doors, and which provide easy access for different kinds of swinging doors, including interior doors found in most homes, front entry doors, doors between the garage and interior of the house, etc. However, such residential automatic door operators are typically targeted to specific types of customers, such as senior citizens and handicapped individuals, since they tend to be expensive and complicated. The majority of the public would find these operators too expensive and difficult to install. Thus, what is needed is a system and method that overcomes these deficiencies and enables the general public to afford the ease of accessibility of an automatic door operator.

BRIEF SUMMARY OF THE INVENTION

Systems and methods for operating a barrier are disclosed. In one embodiment, a system includes an alternating current (AC) synchronous motor coupled to control logic and a barrier, where the AC synchronous motor actuates the barrier along a path in response to an activation signal from the control logic. The system further includes an obstacle detector coupled to one or both of the control logic and the AC synchronous motor. In one embodiment, the obstacle detector provides an obstruction signal when an obstacle is in the path of the barrier and, in response to the obstruction signal, the AC synchronous motor stops actuating the barrier along the path.

Other embodiments are disclosed and claimed herein.

DETAILED DESCRIPTION OF EXEMPLARY EMBODIMENTS

Figure 1:
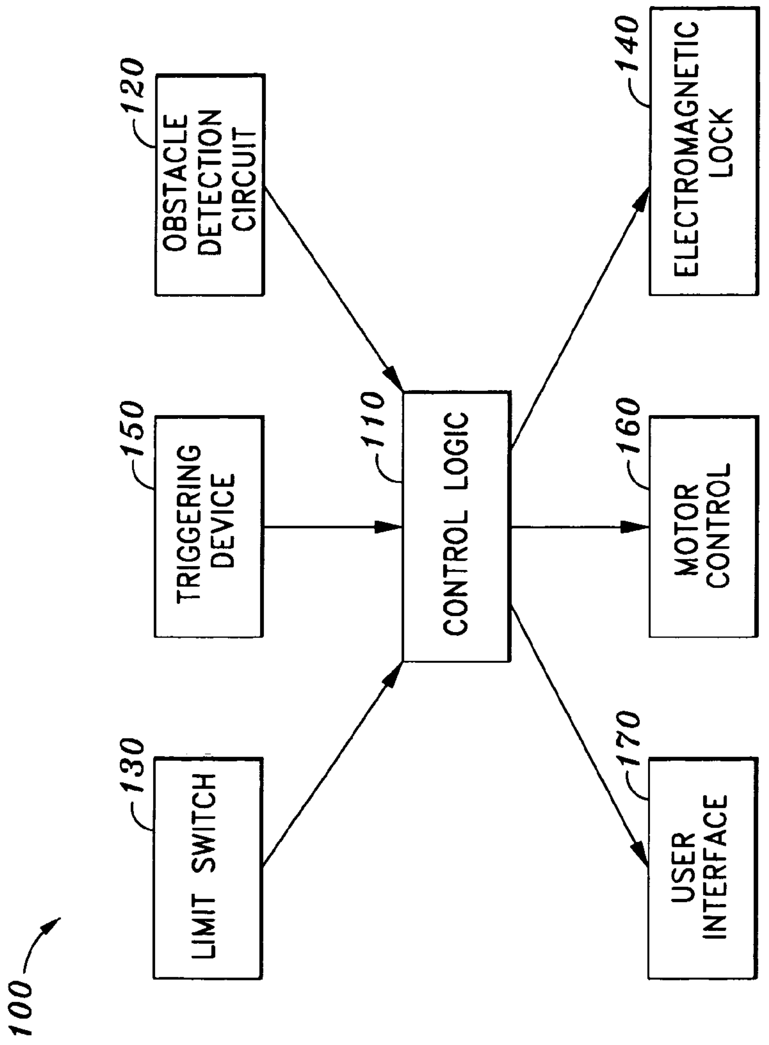
FIG. 1 illustrates one embodiment of the electrical system of a door operator, provided in accordance with the principles of the invention.

One aspect of the invention involves a simplified door operator design, with fewer mechanical and electrical components than conventional automatic door operators. Unlike most existing door operators, which can only be used on in-swing doors, another aspect of the invention relates to mounting and operation of both in-swing and out-swing doors, as well as left- or right-hinged doors. With fewer mechanical and electrical components, the cost of the door operator can be reduced. In addition, the overall size of the door operator may also be reduced.

In one embodiment, the door operator can be opened or closed by a hard wired wall button, or by triggering an external device when one is approaching/leaving the door. Such an external device may be any input device, such as a remote control, infrared detector, walk-on floor mats, etc. In addition to opening or closing the door automatically, in one embodiment if an obstacle is detected when the door is opening or closing, the door will either stop or swing in the reverse direction to avoid damaging the obstacle. It should similarly be appreciated that the door can also be operated manually, such as in the case of a power failure. In yet a further embodiment, the door operator is implemented using an alternating current (AC) synchronous motor. The use of an AC synchronous motor may provide one or more of the following advantages:

1. Safety—e.g., temperature and current overloading not an issue.

2. Reduction in cost and design complexity—e.g., current detection is not needed, overload protection is not needed.

3. Simple gearbox assembly due to slow rotational speed of AC synchronous motor.

4. Limited force required to open and close the door of coupled to an AC Synchronous motor reduces injury and eliminates the need to control the speed of a closing the door.

It should further be appreciated that other embodiments of the door operator may include an auto-stop feature in which, if an obstacle is detected when the door is opening or closing, the door operator may be caused to stop so as to avoid damage to the obstacle and/or to the door itself. In another embodiment, the door operator may include a manual override feature in which the door may be opened/closed manually by just pushing or pulling the door handle/knob at any time. An auto-reverse feature may also be incorporated into the design of one embodiment to enable the door to swing in a reverse direction if an obstacle is detected in the door's path while either opening or closing. In addition, the door operator may be equipped with an electrical latching device (e.g., an electromagnetic lock), which is easy to install and does not require removal of an existing lockset and latch assembly. One can simply attach the electromagnetic lock to the door and doorframe. A blocking plate may be mounted on the doorframe, over the existing latch strike. By using the blocking plate, the latch bolt of the existing lock will not be in contact with the latch strike, and therefore unable to lock the door. This may be preferable to removing the entire mechanical lock. Moreover, another aspect of the invention is to remove the need for a conventional door closing mechanism since the door operator as described herein may open as well as close a swinging door.

As mentioned earlier, the use of an AC synchronous motor with a door operator reduces the number of components significantly, both mechanically and electrically. An overload protection circuit, such as current detection and temperature detection, is not needed since the temperature and electrical characteristics of AC synchronous motor do not vary much between normal operating and overloaded conditions. When the motor is stalled in a typical direct current (DC) or AC motor, the operating current will rise dramatically and therefore cause the temperature to increase. This may introduce a risk of fire, electric shock, or injury. However, with an AC synchronous motor, the temperature and current consumption during overloading conditions are similar to those during normal operating conditions. Therefore, both current and temperature protection mechanisms are not needed, thereby making the electrical design of the door operator much simpler.

Another characteristic of an AC synchronous motor is that the rotational speed is relatively slow as compared to traditional DC and AC motors. For example, an AC synchronous motor normally runs below 1000 rpm without any speed reduction gear assembly, whereas most conventional AC motors operate at a speed of at least 1500 rpm. Similarly, DC motors normally operate at 3000 rpm or above.

For automatic door operators, the speed of the output shaft should be relatively slow (e.g., 5–10 rpm) in order to optimize the opening and closing speed of the door. Reducing the speed from the motor output member to the desired driving speed of 10 rpm requires a speed-reduction gear assembly. Due to the slow rotational speed of an AC synchronous motor, the amount of speed reduction required to reach optimal operating conditions is considerably lower with an AC synchronous motor than with conventional AC and DC motors. The lower the required speed reduction, the simpler the design of the gear assembly will be.

Referring now to the figures, in one embodiment an automatic door operator consistent with the principles of the invention comprises a motor 230 (FIG. 2) or 310 (FIG. 3) with speed reduction gear assembly 330 (FIG. 3), a linkage 430 (FIG. 4) between the gear assembly 330 and the doorframe 440 (FIG. 4), a slip clutch (located in housing 420 of FIG. 4), a manual clutch (optionally located in housing 420), and control logic 110 (FIG. 1) which may be used to control the motor 230 or 310 and to receive signals from the obstacle detection circuit 120 (FIG. 1) to determine if the movement of the door is interrupted by an obstacle. The automatic door operator may also include a wall button and a wireless receiver (not shown) to receive signal from a wireless transmitter, a limit switch 130 (FIG. 1) which monitors whether the door is in the opened or closed position, and an electrical latching device 140 (such as an electromagnetic lock) to secure the door in place when it is in fully closed position.

Figure 4:
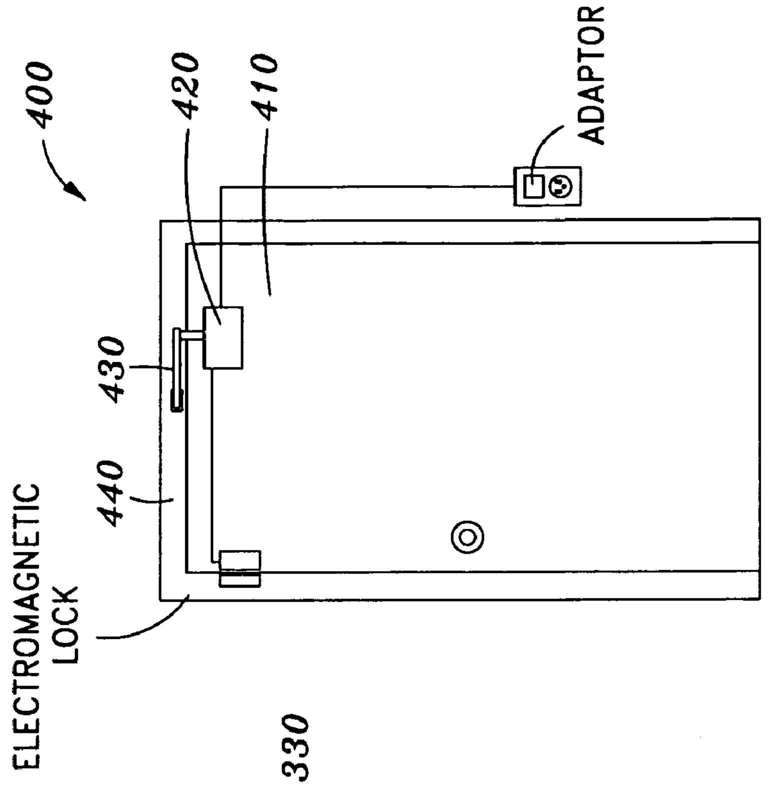
FIG. 4 illustrates one embodiment of an automatic door operator shown mounted on a swinging door.

Referring now specifically to FIG. 1, depicted is one embodiment of the electrical system 100 of an automatic door operator provided in accordance with the principles of the invention. As shown in FIG. 1, the control logic 110 may receive multiple inputs and outputs in order to monitor different conditions, and to control the motor 230 or 310. In one embodiment, there are three input signals to control logic 110. First, limit switch 130 may be used to detect whether the door is in the fully open or fully closed position. The limit switch 130 can be mounted externally or internally (see FIG. 3 for an illustration of one embodiment of the limit switch 130). In another embodiment, the limit switch 130 may be an internal limit switch, that is enclosed within the door operator housing or enclosure 420 (FIG. 4). In such a case, an external switch may not needed, thereby simplifying the installation and reducing the overall cost. It should be appreciated that the limit switch 130 can be any device or circuit capable of detecting the door's position. Moreover, while control logic 110 may be in the form of one or more microprocessors, it should equally be appreciated that it may also be comprised of any hardware control circuit capable of carrying out the operations described herein.

Continuing to refer to FIG. 1, a second input to control logic 110 may be from obstacle detection circuit 120. As will be described in more detail below with reference to FIG. 2, an obstacle can be detected when it exerts a force on the door which is greater than the rate torque output of the motor. With this obstacle detector 120 connected to the control logic 110, the control logic 110 can continuously monitor if an obstacle is obstructing the door's movement. It should also be appreciated that the obstacle detector 120 may similarly be coupled directly to the motor control circuit 160 (as described below).

The third input to control logic 110 shown in FIG. 1 is from triggering device 150. This triggering device 150 can be a remote control, a passive infrared sensor, active infrared sensor, pressure sensitive mat, or any device or circuit capable of providing an input to control logic 110 to initiate a door opening/closing sequence.

In addition to the three inputs mentioned above, the embodiment of FIG. 1 also depicts the control logic 110 as having three outputs. The first such output is to a motor control circuit 160 that may be used to control/activate the motor 230 or 310. In one embodiment, if a set of predefined door opening or closing conditions are met, the control logic 110 will send a signal to the motor control circuit 160 to power up/down the motor 230 or 310. The second depicted output from control logic 110 is to user interface 170, which may be used to provide an indication regarding the status of the door and/or door operator. In one embodiment, information such as whether the door is in fully open position, fully closed position, or somewhere in between can be displayed through this user interface. Finally, the control logic 110 may also be coupled to an electrical latching device, such as the electromagnetic lock 140 mentioned above. The electromagnetic lock 140 may be used to secure the door in the fully closed position. When the door reaches the fully closed position, the control logic 110 may send a signal to the electromagnetic lock 140 in order to secure the door in place. In contrast, when a door opening signal is received by the control logic 110 from triggering device 150, the control logic 110 may send a signal to release the electromagnetic lock 140 to unlock the door and begin the door opening sequence.

Another aspect of the invention is to provide an automatic door operator that has a protection feature to avoid or reduce the injury to persons or other entities. In one embodiment, the automatic door operator can detect if an obstacle is being hit by the door when the door operator is functioning (for example using obstacle detection circuit 120). Such detection may be accomplished by measuring the slight change in the AC power line signal when an object is hit, resulting in an external force being applied to the door. This force is transferred the motor and, with appropriate circuitry, this slight change can be detected.

One of the characteristics of AC synchronous motor is that it will rotate in the reverse direction if a force, which is greater than the rated torque, is applied against the rotating direction. In one embodiment, this reverse motion may be monitored so that the interference of an obstacle with the door's movement can be detected. When the reverse motion occurs, a low frequency signal generated by the motor can be detected by having an amplifying circuit, as shown as part of the obstacle detection circuit of FIG. 2.

Figure 2:
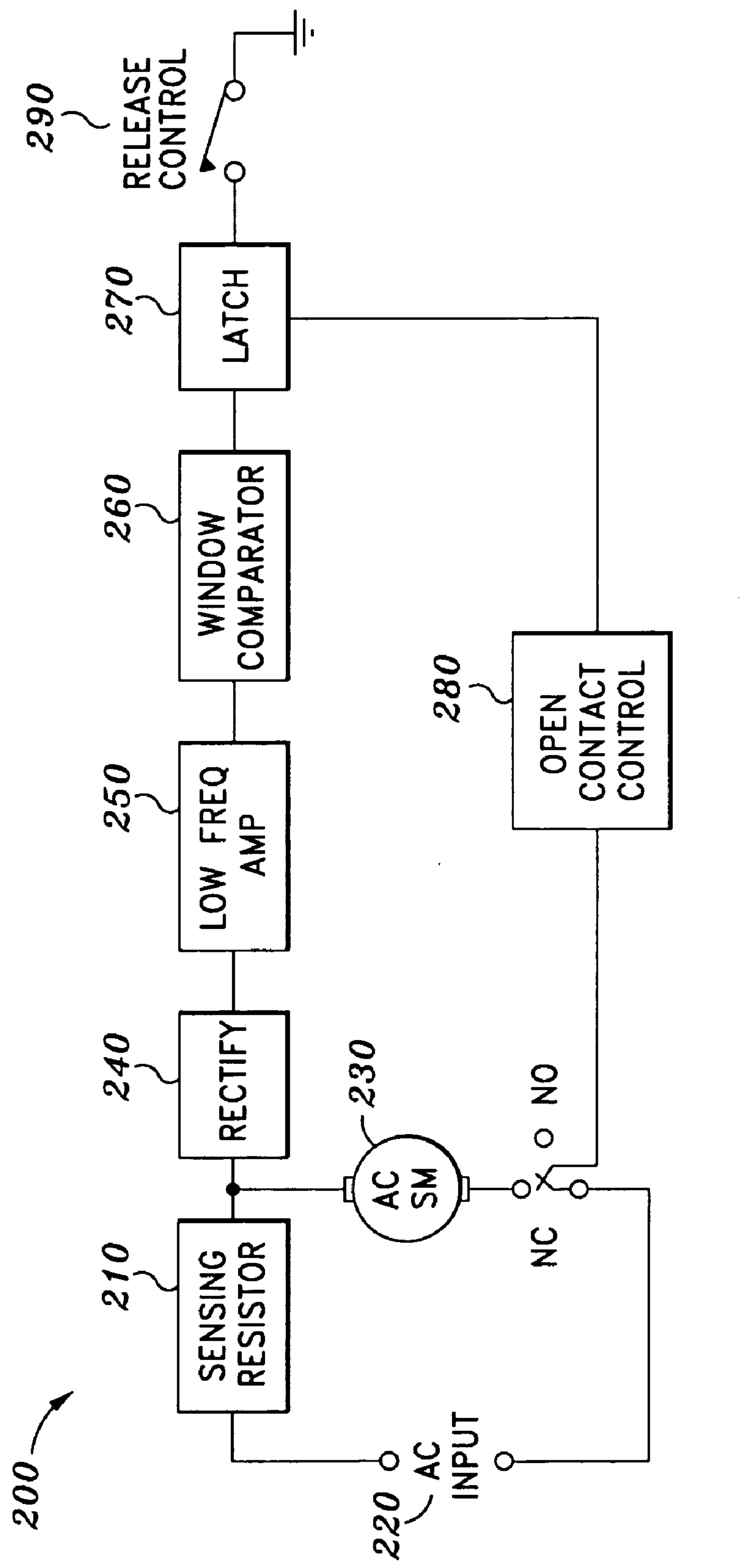
FIG. 2 illustrates one embodiment of an obstacle detection circuit in accordance with one aspect of the invention.

As shown in FIG. 2, a sensing resistor 210 connected in series with the AC power source 220 and the motor 230 may be used to receive a signal. A weak signal with low frequency (e.g., approx. 1 Hz) is generated by the motor 230 when reverse motion occurs. By having the resistor 210 coupled to the power source 220 and motor 230, this low frequency signal can be detected. Moreover, such signal may be converted to a DC signal by passing it through a rectifier 240. At that point, a low frequency amplifier, such as amplifier 250, may be used to amplify the low frequency signal. Moreover, since the gain of this low frequency amplifier 250 decreases as the frequency of the signal increases, this amplifier 250 may be targeted to amplify only low frequency signals.

Thereafter, the window comparator 260 may perform a sensitivity adjustment control. For signals which do not reach a preset level of the window comparator 260, that signal will not activate the latching circuit 270, and therefore will not indicate that an obstacle has been detected. If the magnitude of the amplified signal is greater than the preset level of the window comparator 260, the latching circuit 270 will be activated, indicating the presence of an obstacle and the open contact control 280 will stop the motor. The motor can also be stopped by an external signal, such as a remote controlled signal. If an external signal is received, the release control 290 can also activate the open contact control 280 in order to stop the motor.

Once an obstacle is detected, the control logic 110 can immediately stop the motor 230 from rotating to reduce further injury/damage to the obstacle and/or door. Alternatively, the rotational direction of the motor 230 may be reversed when an obstacle is hit by the door. This rotational direction reversal may be done automatically by the AC synchronous motor (e.g., when the force exerted by the obstacle is greater than the motor's 230 rated torque), or may be implemented as a control signal from the control logic 110 (e.g., after detection of an obstacle, a control signal can be sent from the control logic 110 to the motor 230 to rotate in the reverse direction).

Figure 3:
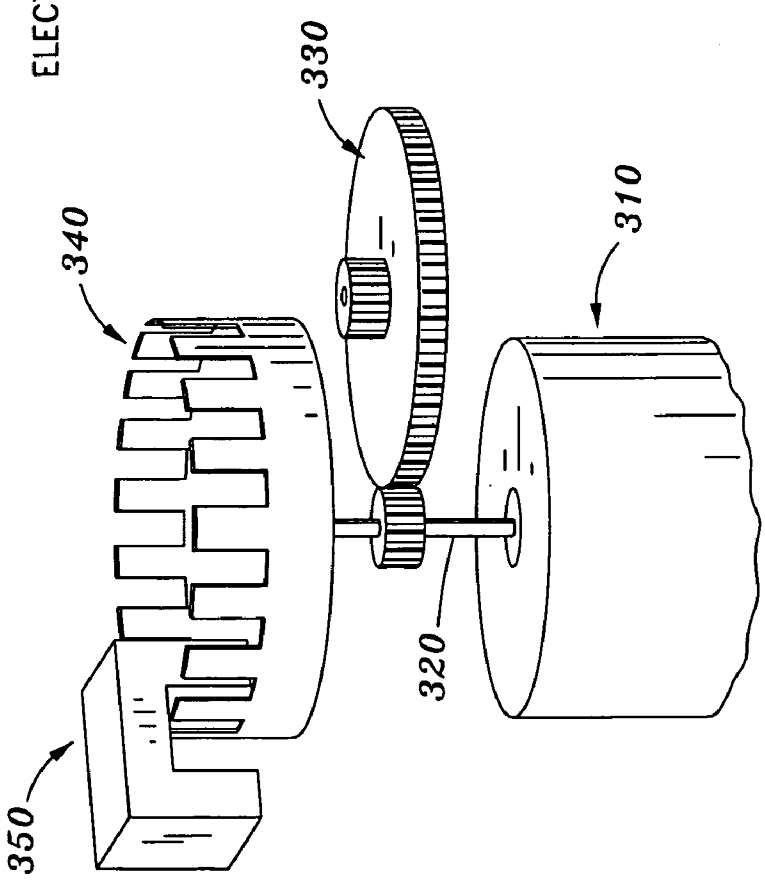
FIG. 3 illustrates one embodiment of a limit switch with gear limit disc and photointerrupter.

Referring now to FIG. 3, depicted is an AC synchronous motor 310 having a shaft 320 coupled to a simplified depiction of a gear assembly 330 and a gear limit disc 340. Since the number of teeth on gear assembly 330 is higher than the teeth on the gears of shaft 320, in combination such gears act as a rotational speed reduction gear assembly. A photointerrupter 350 also may be incorporated into the gear limit disc 340, as shown in FIG. 3. In one embodiment, the position of the door is monitored by attaching the gear limit disc 340 to the output shaft 320 of the motor 310. Integrating this gear limit disc 340 with a photointerrupter 350 allows the control logic 110 to count the required number of rotations from the fully open position to the fully closed position. Therefore, during the operation of the door operator, the control logic 110 is able to monitor the position of the door continuously.

FIG. 4 illustrates one embodiment of an automatic door operator 400 shown mounted on a swinging door 410. In this embodiment, the automatic door operator 400 comprises a housing 410, which may include the motor, 310, gear assembly 330, gear limit disc 340, photointerrupter 350, logic board (not shown), slip clutch (not shown), etc. If a force is applied to the door which exceeds the limit that the gear assembly 330 can withstand, the gear assembly 330 and the motor 310 may be damaged. Therefore, it may be desirable to have a protection feature which protects the motor 310 from being damaged if an external force is applied to the door. To that end, a slip clutch (which may be located in housing 420) may be used to isolate the linkage 430 on the door 410 and the gear assembly 330 when a force exceeding the design limit is applied to the door 410. The slip clutch may have an adjustable torque limit, and may be adjusted so that when a force greater than the maximum limit of the gear assembly 330 is applied, the slip clutch will disengage the gear assembly 330 from the door's linkage 420, thus protecting the motor 310 and the gear assembly 330 from being damaged.

A manual clutch may also be implemented if the automatic door operator 400 will not be operated for a long period of time. This manual clutch allows disengagement between the linkage 430 and the gear assembly 330 manually. If the clutch is set to disengage, the door can be swung freely without engaging to the gear assembly 330 until the clutch is manually reengaged.

Figure 5:
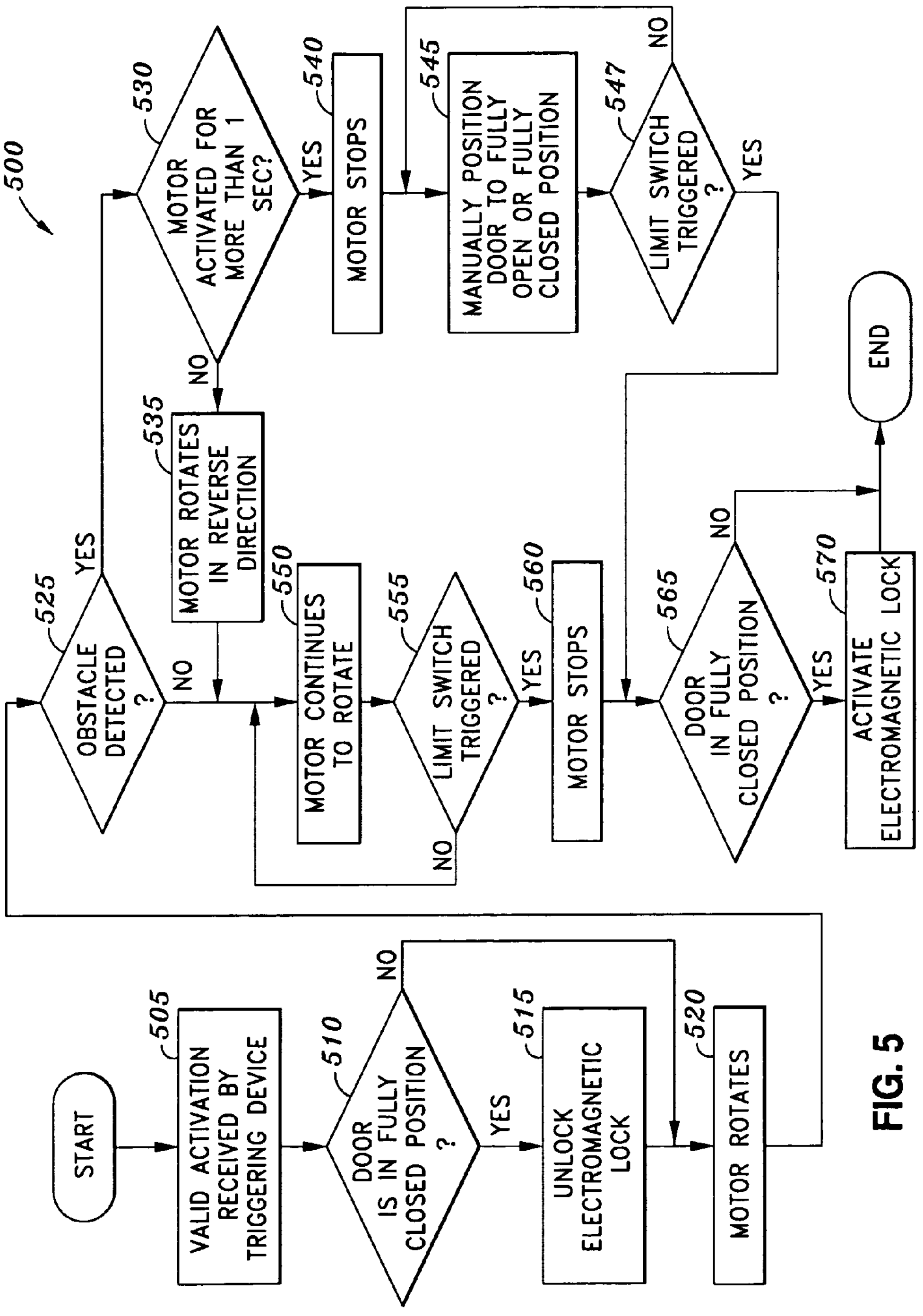
FIG. 5 is a flowchart illustrating one embodiment of a process for operating a barrier consistent with the principles of the invention.

FIG. 5 is a flowchart of one embodiment of a process 500 for operating the automatic door operator 400 of FIG. 4. Process 500 begins at block 505 when the control logic 110 receives a valid activation signal from triggering device 150. Before directing the motor to start up, process 500 has to determine if the door 410 is in the fully closed position (block 510). If so, control logic 110 may have to unlock the electromagnetic lock 140 (block 515). If the door 410 is not closed or the electromagnetic lock 140 is not locked, then process 500 may continue to block 520 where the control logic 110 directs the motor to rotate (e.g., using motor control circuit 160).

At this point, process 500 continues to decision block 525 where the obstacle detection circuit 120 determines if there is an obstacle in the door's 410 path. If so, process 500 will continue to decision block 530 where a determination is made as to whether the motor has been activated for more than one second (although a greater or lesser amount of time may similarly be used). In one embodiment, the purpose of decision block 530 is to allow time for the motor to reverse rotational direction if the motor is equipped with such a feature (block 535), or alternatively, to be stopped by control logic 110 when the motor is not so equipped (block 540). Moreover, once the motor has been stopped by control logic 110, the door 410 may be manually positioned (block 545). Since the door 410 has a limited range of motion, decision block 547 may be used to determine if the limit of the door's 410 movement has been reached (i.e., the door is either fully opened or fully closed). If the door's range-of-motion limit has been reached, then process 500 determines whether it's the fully closed position or the fully open position that has been reached (block 565). If the fully closed position has been reached, then the electromagnetic lock 140 may be activated to lock the door 410 in place (block 570).

If, on the other hand, no obstruction is detected at decision block 525, process 500 may continue to block 550 where the motor continues to rotate and hence operate the door 410. Since the door 410 has a limited range of motion, decision block 555 is used to determine if the limit of the door's 410 movement has been reached (i.e., the door is either fully opened or fully closed). If the door's range-of-motion limit has been reached, then process 500 will proceed to block 560 where the motor is stopped. If the door's range-of-motion limit has not been reached, then the motor will continue to rotate and operate the door.

If the door 410 is closing, the motor may continue to operate the door 410 until it is in the fully closed position. Once process 500 determines that the door 410 has reached the fully closed position (block 565), the electromagnetic lock 140 may be activated to lock the door 410 in place (block 570).

While the preceding description has been directed to particular embodiments, it is understood that those skilled in the art may conceive modifications and/or variations to the specific embodiments described herein. Any such modifications or variations which fall within the purview of this description are intended to be included herein as well. It is understood that the description herein is intended to be illustrative only and is not intended to limit the scope of the invention.

What is claimed is:

1. A system for operating a barrier comprising:

a control logic;

an alternating current (AC) synchronous motor coupled to said control logic and said barrier, said AC synchronous motor to actuate said barrier along a path in response to an activation signal from said control logic; and an obstacle detector coupled to at least one of the control logic and the AC synchronous motor, the obstacle detector including a sensing resistor for detecting when a force is exerted on said AC synchronous motor, the obstacle detector to provide an obstruction signal when an obstacle is in the path of said barrier, and wherein said obstruction signal causes the AC synchronous motor to stop actuating said barrier along said path.

2. The system of claim 1 further comprising a linkage coupling said AC synchronous motor to said barrier.

3. The system of claim 2 further comprising a slip clutch coupled to said linkage, said slip clutch to disengage a gear assembly of said AC synchronous motor from said linkage in response to the application of an external force greater than a design limit of said slip clutch.

4. The system of claim 1 further comprising an electromagnetic lock to secure said barrier when in a fully closed position.

5. The system of claim 1 further comprising a triggering device coupled to said control logic, wherein said triggering device is usable to cause said control logic to provide said activation signal to said AC synchronous motor.

6. The system of claim 1 further comprising a limit switch couple to the control logic and said AC synchronous motor, said limit switch to detect when said barrier has reached one of a fully closed position and a fully open position, and to signal to said control logic that the AC synchronous motor should stop actuating said barrier along said path.

7. The system of claim 6 further comprising a photointerrupter means and a gear limit means, said photointerrupter means and gear limit means usable to detect a number of revolutions of said AC synchronous motor from a fully open position of said barrier to a fully closed position of said barrier.

8. The system of claim 1, wherein said sensing resistor detects a low frequency signal generated when said obstacle causes a reverse motion of the AC synchronous motor, and wherein said obstacle detector further comprises:

a power source coupled to the sensing resistor;

an amplifier coupled to the sensing resistor and the power source, said amplifier to amplify said low frequency signal; and a comparator to compare a magnitude of said low frequency signal to a preset level and, when said magnitude is greater than said preset level, said obstacle detector to provide said obstruction signal.

9. The system of claim 8, wherein said power source is an alternating current power source, and said obstacle detector further comprises a rectifier coupled to said sensing resistor, said power source, said amplifier and said comparator, said rectifier to cause said low frequency signal to become a direct current signal.

10. The system of claim 1, wherein, in response to said obstruction signal, said AC synchronous motor reverses rotational direction such that said barrier is actuated in an opposite path to said obstruction.

11. The system of claim 1 further comprising a linkage coupling to said barrier;

a shaft coupling said AC synchronous motor to said linkage; and a gear assembly coupled to said shaft to said AC synchronous motor, said gear assembly to reduce a rotational speed of said shaft.

12. The system of claim 1, further comprising a remote control for providing said control logic with one or more signals for controlling said barrier.

13. The system of claim 12, wherein said remote control is one of a radio frequency remote control and a infrared remote control.

14. A method for operating a barrier comprising:

sending an activation signal by a control logic to an alternating current (AC) synchronous motor;

actuating said barrier along a path using said AC synchronous motor in response to said activation signal;

sensing a low frequency signal generated when an obstacle exerts a force on said AC synchronous motor providing an obstruction signal to at least one of said control logic and the AC synchronous motor in response to said sensing;

stopping said actuating of the barrier along said path in response to said obstruction signal.

15. The method of claim 14 wherein actuating said barrier comprises actuating said barrier along the path in response to said activation signal using a linkage coupled to said AC synchronous motor and said barrier.

16. The method of claim 15 further comprising disengaging said linkage from a gear assembly of said AC synchronous motor using a slip clutch, said disengaging to be in response to the application of an external force greater than a design limit of said slip clutch.

17. The method of claim 14 further comprising securing said barrier in a fully closed position using an electromagnetic lock.

18. The method of claim 14 wherein sending the activation signal comprises sending the activation signal by the control logic in response to the activation of a triggering device coupled to said control logic.

19. The method of claim 14 further comprising:

detecting when said barrier has reached one of a fully closed position and a fully open position using a limit switch coupled to the control logic and said AC synchronous motor; and signalling to said control logic that the AC synchronous motor should stop actuating said barrier along said path.

20. The method of claim 19 further comprising detecting a number of revolutions of said AC synchronous motor from a fully open position of said barrier to a fully closed position of said barrier.

21. The method of claim 14, wherein sensing comprises sensing the low frequency signal when the obstacle causes a reverse motion of the AC synchronous motor, the method further comprising:

amplifying the low frequency signal;

comparing a magnitude of said low frequency signal to a preset level; and, providing, when said magnitude is greater than said preset level, said obstruction signal to said control logic.

22. The method of claim 21, further comprising converting said low frequency signal to a direct current signal.

23. The method of claim 14, further comprising reversing rotational direction of said AC synchronous motor in response to said obstruction signal such that said barrier is actuated in an opposite path to said obstruction.

24. The method of claim 14 further comprising reducing a rotational speed of a shaft of said AC synchronous motor.

25. The method of claim 14, further comprising receiving one or more signals from a remote control, where said remote control communicates with said control logic to control said barrier.

26. The method of claim 25, wherein said one or more signals are one of radio frequency signals and infrared signals.

27. A system for operating a barrier comprising;

a control logic;

an alternating current (AC) synchronous motor coupled to said control logic and said barrier, said AC synchronous motor to cause said barrier to open and or close along a path in response to an activation signal from said control logic;

an obstacle detector coupled to at least one of the control logic and the AC synchronous motor, the obstacle detector to, magnify a low frequency signal generated when an obstacle in said path causes a reverse motion of the AC synchronous motor, and compare a magnitude of said low frequency signal to a preset level and, when said magnitude is greater than said preset level, said obstacle detector to provide an obstruction signal, and wherein, in response to said obstruction signal, the AC synchronous motor stops actuating said barrier along said path.

28. The system of claim 27 further comprising a linkage coupling said AC synchronous motor to said barrier.

29. The system of claim 28 further comprising a slip clutch coupled to said linkage, said slip clutch to disengage a gear assembly of said AC synchronous motor from said linkage in response to the application of an external force greater than a design limit of said slip clutch.

30. The system of claim 27 further comprising an electromagnetic lock to secure said barrier when in a fully closed position.

31. The system of claim 27 further comprising a triggering device coupled to said control logic, wherein said triggering device is usable to cause said control logic to provide said activation signal to said AC synchronous motor.

32. The system of claim 27 further comprising a limit switch couple to the control logic and said AC synchronous motor, said limit switch to detect when said barrier has reached one of a fully closed position and a fully open position, and to signal to said control logic that the AC synchronous motor should stop actuating said barrier along said path, wherein said limit switch is based on a number of revolutions of said AC synchronous motor from a fully open position of said barrier to a fully closed position of said barrier.

33. The system of claim 27, wherein said control logic, further in response to said obstruction signal, causes the AC synchronous motor to reverse rotational direction such that said barrier is actuated in an opposite path to said obstruction.

34. The system of claim 27 further comprising a linkage coupling to said barrier;

a shaft coupling said AC synchronous motor to said linkage; and a gear assembly coupled to said shaft to said AC synchronous motor, said gear assembly to reduce a rotational speed of said shaft.

35. The system of claim 27, further comprising a remote control for providing said control logic with one or more signals for controlling said barrier.

36. The system of claim 35, wherein said remote control is one of a radio frequency remote control and a infrared remote control.

37. An obstacle detector for detecting a force exerting by an obstacle on a AC synchronous motor comprising:

a sensing resistor for detecting a low frequency signal generated when a force is exerted on an AC synchronous motor;

a power source coupled to the sensing resistor;

an amplifier coupled to the sensing resistor and the power source, said amplifier to amplify said low frequency signal; and a comparator to compare a magnitude of said low frequency signal to a preset level and, when said magnitude is greater than said preset level, said obstacle detector to provide an obstruction signal to said AC synchronous motor.

38. The obstacle detector of claim 37, wherein said power source is an alternating current power source, the obstacle detector further comprising a rectifier coupled to said sensing resistor, said power source, said amplifier and said comparator, said rectifier to cause said low frequency signal to become a direct current signal.

39. The obstacle detector of claim 37, wherein said obstruction signal causes the AC synchronous motor to reverse rotational direction.

* * * * *